Patented June 16, 1953

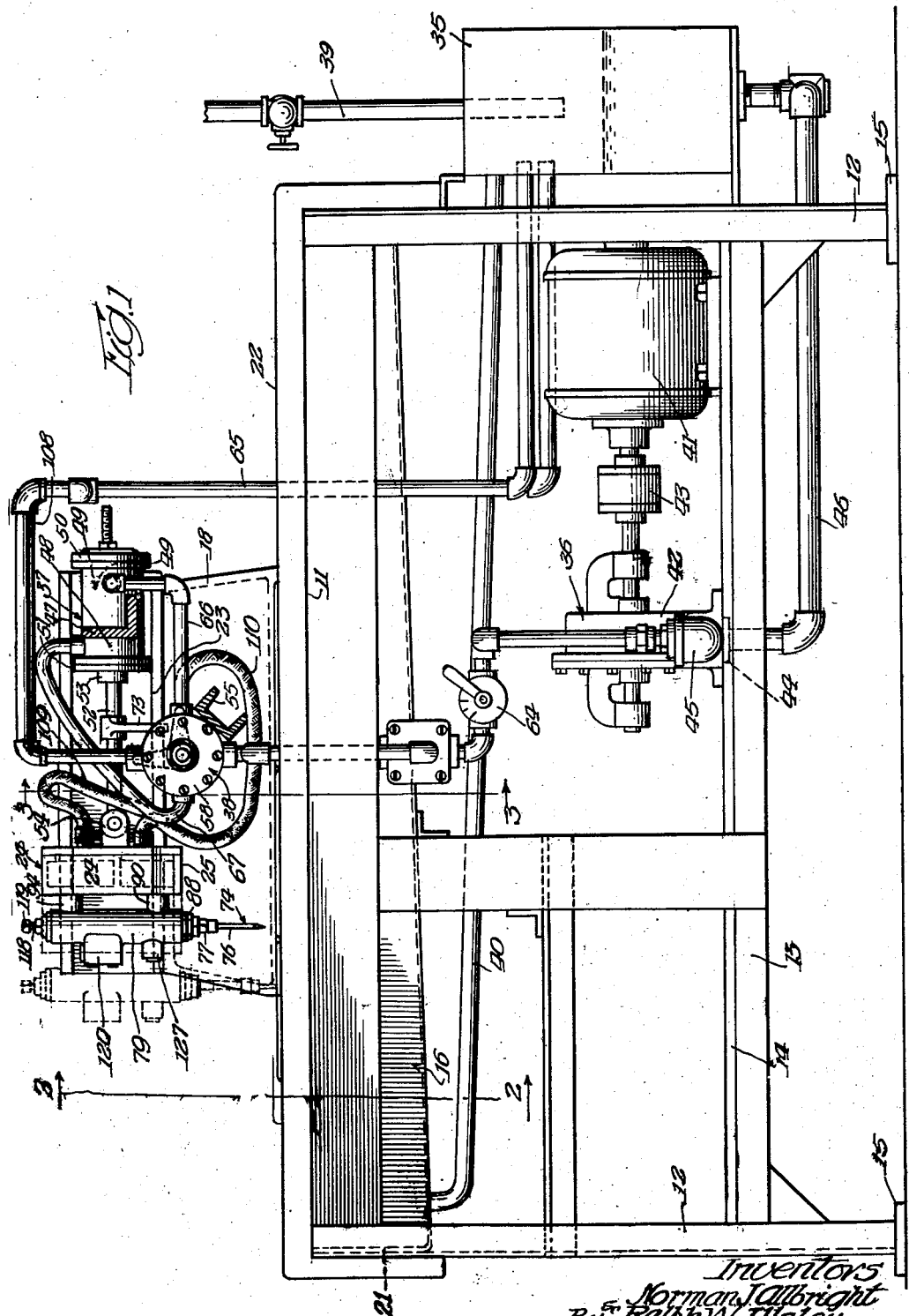

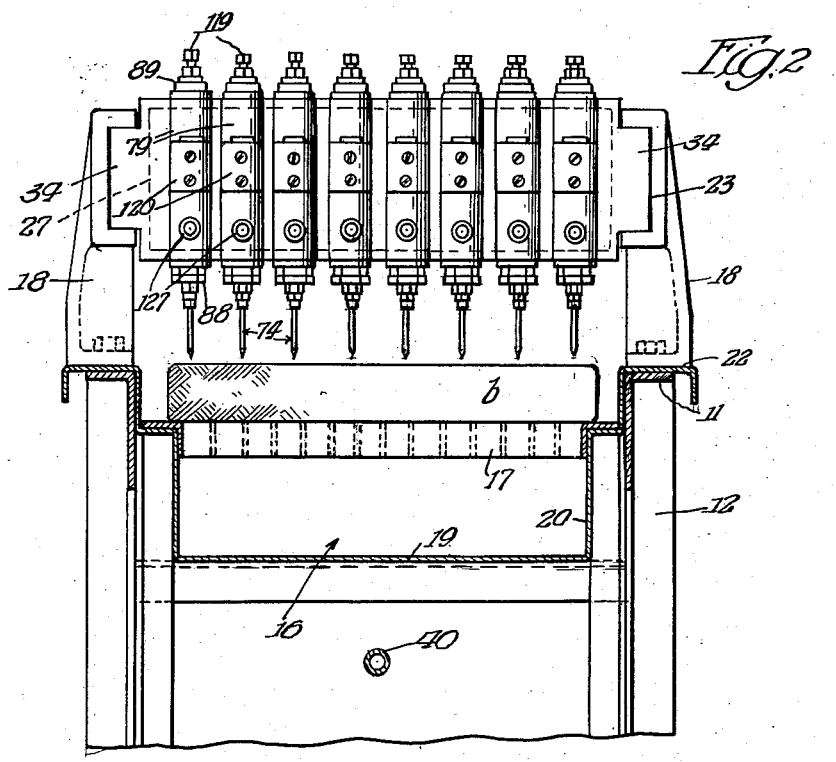
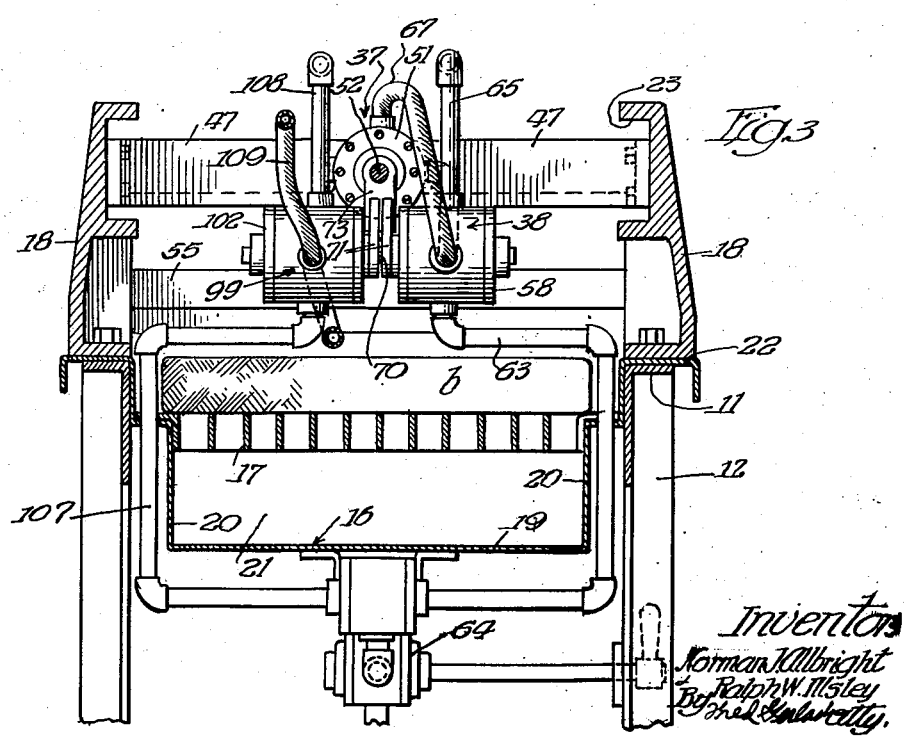

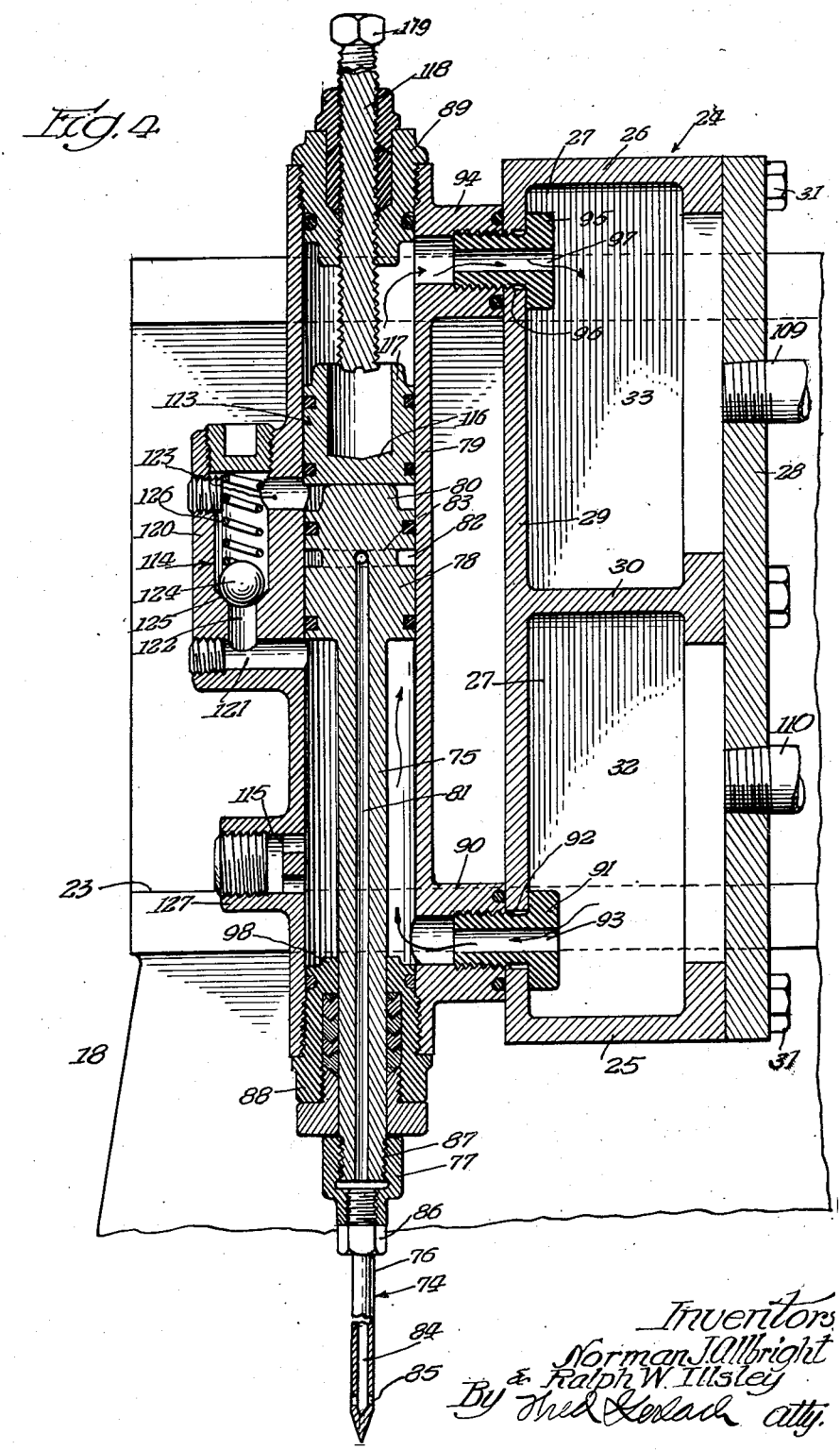

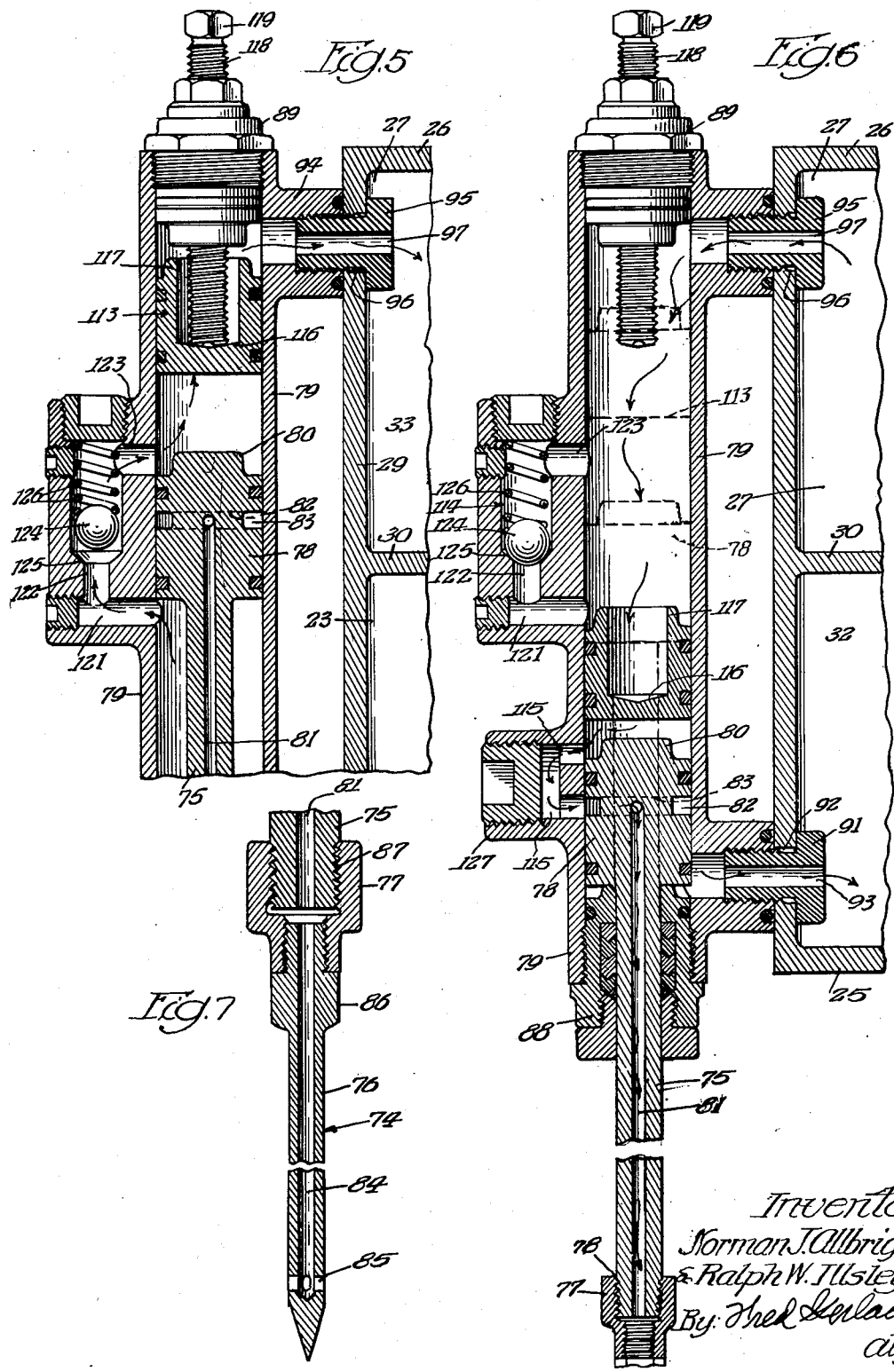

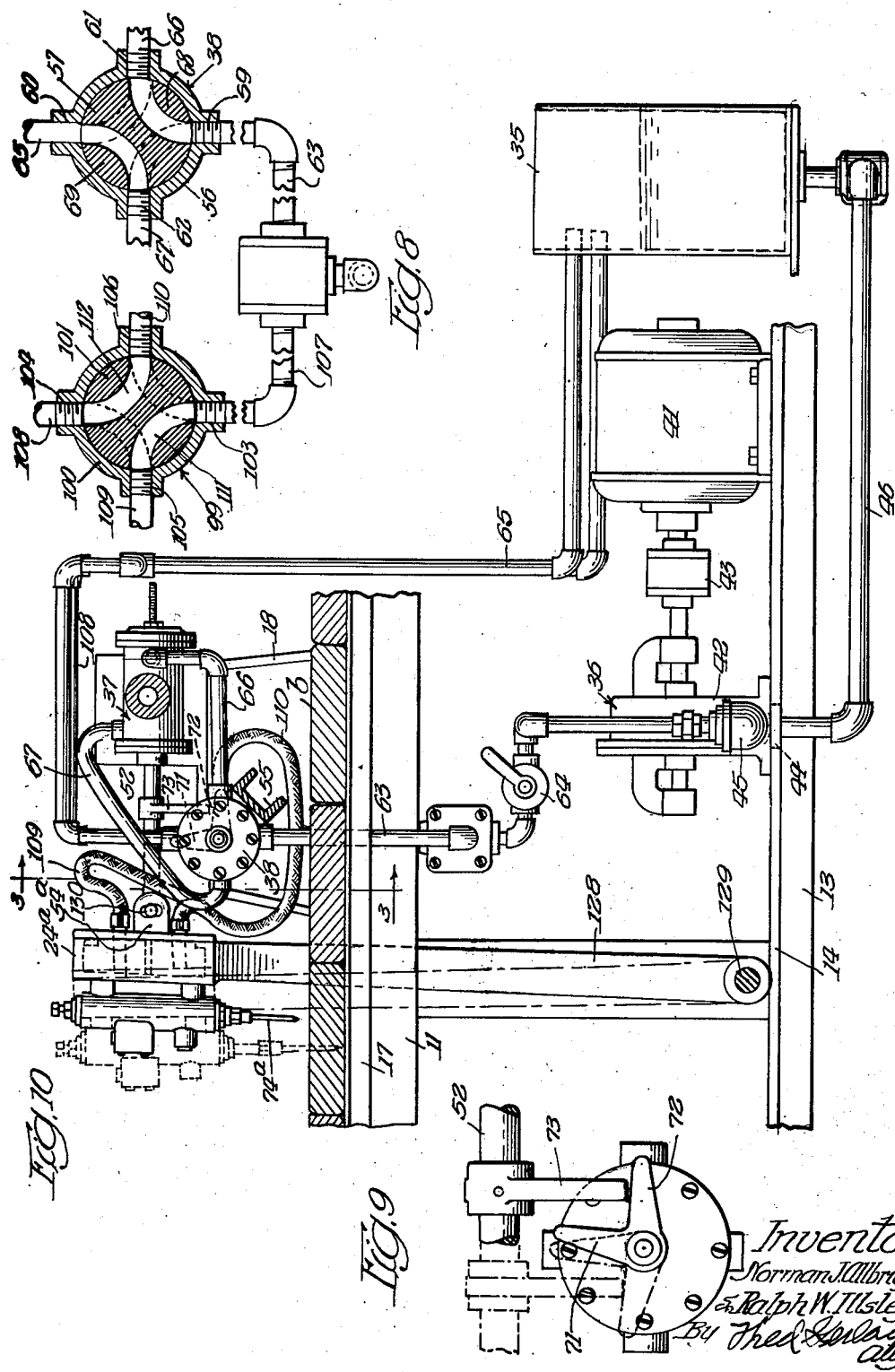

2,641,990

UNITED STATES PATENT OFFICE 2,641,990

AUTOMATIC APPARATUS FOR INJECTING CURING LIQUID INTO HOG BELLIES AND THE LIKE

Norman J. Allbright and Ralph W. Illsley, Chicago, Ill., assignors to The Allbright-Nell Company, Chicago, Ill., a corporation of Illinois Application September 27, 1951, Serial No. 248,577

11 Claims. (Cl. 99—257)

The present invention relates generally to apparatus for injecting curing liquid, such as brine, into hog bellies and the like. More particularly the invention relates to that type of brine injecting apparatus which is designed primarily for use in a meat packing plant in connection with the production of bacon, and as its principal components or parts comprises: (1) a horizontally elongated frame structure which is adapted to rest on the floor of the packing plant and embodies at the upper portion thereof longitudinally extending means for supporting the bellies to be treated so that they are horizontally movable one after the other from the front end of the frame structure to the rear end; (2) a horizontally extending crosshead which is disposed over and transversely of the central portion of the frame structure; (3) a series of laterally spaced upstanding hollow needles which are associated with, and project downwards from, the crosshead, have discharge apertures at their lower ends and are movable downwards and upwards in order to effect insertion of their lower ends into the subjacent belly and subsequent withdrawal therefrom; and (4) automatic means whereby each time the needles are moved downwards into inserted or penetrating relation with the subjacent belly brine under pressure is forced through the needles and into such belly.

One object of the invention is to provide a brine injecting apparatus of this type which is an improvement upon, and has certain inherent advantages over, previously designed apparatus for the same purpose and is characterized by high efficiency, a novel and compact arrangement of parts and high speed and completely automatic operation.

Another object of the invention is to provide an apparatus of the type under consideration in which the needles are mounted to move laterally back and forth lengthwise of the frame structure as well as down and up and are adapted in connection with operation of the apparatus first to move downwards into penetrating relation with the subjacent belly, then to move laterally with the subjacent belly a small distance in the direction of the rear end of the frame structure, then to move upwards out of penetrating relation with the subjacent belly and then to move laterally in the opposite direction, that is, towards the front end of the frame structure.

Another object of the invention is to provide a brine injecting apparatus of the last mentioned character in which the needles are mounted to slide downwards and upwards with respect to the crosshead and have associated therewith valve controlled fluid pressure operated means for sliding them downwards and upwards relatively to the crosshead, and the crosshead is mounted for lateral movement lengthwise of the frame structure and has associated with it valve controlled fluid pressure operated means for shifting it laterally back and forth in order to effect the second and fourth movements of the needles during each cycle of needle operation and also to cause the needles during their second movement of each cycle of operation to feed the subjacent belly a predetermined distance towards the rear or discharge end of the frame structure without the use of special or auxiliary power actuated feed means.

Another object of the invention is to provide a brine injecting apparatus of the type and character under consideration in which the valves of the two fluid pressure operated means are of the two-position type and are connected together for conjoint operation, and such two means are so designed and constructed that when the valves are conjointly shifted into one position the needles are caused to slide downwards and the crosshead, together with the needles, is rearwards and when shifted the valves are conjointly shifted into their other position and the needles are caused to slide upwards and the crosshead is caused to shift forwards so as to return the needles to their normal or starting position and complete the cycle of operation.

Another object of the invention is to provide a brine injecting apparatus of the aforementioned type in which the needles are provided at the upper ends thereof with pistons which are mounted for vertical sliding movement in the lower portions of vertically extending cylinders on the crosshead and form parts of the fluid pressure operated means for sliding the needles downwards and upwards.

A further object of the invention is to provide a brine injecting apparatus of the character under consideration in which the automatic means for forcing brine under pressure through the needles when the latter are in penetrating relation with the subjacent belly is of simple and novel construction and comprises free or floating variety pistons which are mounted for vertical sliding movement in the upper portions of the vertically extending cylinders on the crosshead.

A still further object of the invention is to provide a brine injecting apparatus which is generally of new and improved construction, may be manufactured at a comparatively low cost and effectively and efficiently fulfills its intended purpose.

Other objects of the invention and the various advantages and characteristics of the present brine injecting apparatus will be apparent from a consideration of the following detailed description.

The invention consists in the several novel features which are hereinafter set forth and are more particularly defined by claims at the conclusion hereof.

2,641,990

In the drawings which accompany and form a part of this specification or disclosure and in which like numerals of reference denote corresponding parts throughout the several views:

Figure 1 is a side elevation of a brine injecting apparatus embodying the invention, one of the bracket members for supporting the crosshead for horizontal rectilinear sliding movement lengthwise of the frame structure being omitted for purposes of illustration;

Figure 2 is an enlarged vertical transverse section taken on the line 2—2 of Figure 1 and illustrating in detail the construction and manner of mounting of the slidably mounted crosshead and also showing the arrangement of the needles which are associated with, and slide vertically relatively to, the crosshead;

Figure 3 is a vertical transverse section taken on the line 3—3 of Figure 1 and showing in detail the arrangement of the two two-position valves which respectively form parts of the fluid pressure operated means for shifting the crosshead laterally back and forth and the fluid pressure operated means for sliding the needles downwards and upwards relatively to the crosshead;

Figure 4 is an enlarged vertical section illustrating in detail the construction, arrangement and manner of mounting of one of the needles, showing the needle after it has been slid upwards directly following sliding movement of the crosshead toward the rear end of the frame structure, and also showing the free or floating variety piston above the needle in the position that it assumes directly after the needle reaches the end of its upward sliding movement;

Figure 5 is an enlarged fragmentary vertical section substantially like Figure 4 except that it shows the free piston after it has been slid upwards relatively to the needle during lateral sliding movement of the crosshead in the direction of the front end of the frame structure;

Figure 6 is an enlarged vertical section like Figure 4 except that it shows the needle after it has been slid downwards into penetrating relation with the subjacent belly and the free piston above the needle has been slid downwards so as to cause brine to flow downwards through the needle and into such belly;

Figure 7 is an enlarged vertical section of the lower end of the needle that is shown in Figures 4, 5 and 6;

Figure 8 is a diagrammatic view of the two two-position valves;

Figure 9 is a side elevation of the mechanism for automatically shifting the two valves; and Figure 10 is a fragmentary vertical longitudinal section of a brine injecting apparatus embodying another form of the invention.

APPARATUS OF FIGURES 1 TO 9, INCLUSIVE

The apparatus that is illustrated in Figures 1 to 9, inclusive, of the drawings constitutes one form or embodiment of the invention. It is designed primarily for use in a packing plant and serves as a medium or instrumentality for injecting a curing liquid, such as brine, into hog bellies b in connection with the production of bacon. As its principal parts or components the apparatus comprises a frame structure, a horizontally elongated crosshead over the central portion of the frame structure, valve controlled fluid pressure operated means for shifting the crosshead laterally back and forth lengthwise of the frame structure, a series of laterally spaced upstanding vertically slidable hollow needles in associated relation with the crosshead, valve controlled fluid pressure operated means for sliding the needles downwards into penetrating relation with the subjacent belly when the crosshead is initially shifted laterally towards the rear end of the frame structure and for sliding the needles upwards during initial lateral shift of the crosshead towards the front end of the frame structure, and automatic means whereby each time the needles are slid downwards into inserted or penetrating relation with the subjacent belly brine under pressure is forced through the needles and into such belly. In general the apparatus is of unitary character and substantially fully automatic.

*Frame structure*

The frame structure is horizontally elongated and serves as a support for the other parts of the apparatus. It is adapted to rest on the floor of the packing plant and comprises a pair of horizontally extending, parallel, laterally spaced upper members 11, four vertically extending legs 12, a pair of horizontally extending, parallel, laterally spaced lower members 13 and a platform 14. The upper members are preferably in the form of angle bars (see Figs. 2 and 3) and comprise outwardly extending horizontal parts and depending vertical parts that are connected at their upper margins to the inner margins of the horizontal parts. The legs 12 serve to support the upper members 11 in an elevated position and are suitably cross connected. The upper ends of the legs are fixedly connected to the ends of the upper members and the lower ends of the legs are provided with floor engaging feet 15. The horizontally extending lower members 13 extends between, and have their ends fixedly secured to, the lower portions of the legs 12. The platform is horizontally elongated and rests on, and extends lengthwise of, the lower members 13.

In addition to the parts heretofore mentioned the frame structure comprises an elongated trough-like pan 16, a horizontal grill-like support 17 and a pair of bracket members 18.

The pan 16 extends lengthwise of, and is disposed between, the upper members 11 and consists of a flat bottom wall 19, a pair of side walls 20 and a pair of end walls 21. The bottom wall 19 of the pan is downwardly inclined from the front or receiving end of the frame structure (right hand end as viewed in Fig. 1) to the rear or discharge end. The side walls 20 are connected to, and project upwards from, the side margins of the bottom wall 19 and are provided at the upper margins thereof with integral outwardly extending flanges 22 which rest on, and are secured to, the horizontal parts of the upper members 11. The end walls 21 of the pan are connected to, and extend upwards from, the end margins of the bottom wall 19 and have the side margins thereof suitably joined or connected to the end margins of the side walls 20. The pan 16 is preferably formed from sheet metal and serves as a receiver for excess brine.

The horizontal grill-like support 17 extends lengthwise of the pan 16. It is suitably supported in the upper portion of the pan and serves as a medium for supporting the bellies b so that they are movable in series form, i. e., one after the other, from the front end of the frame structure to the rear end. It is contemplated that the operator of the apparatus will stand at the front end of the frame structure and slide the bellies one at a time lengthwise over the horizontal grill-like support 17. After one belly to be treated is placed on the front end of the support and then slid rearwards a short distance another belly is placed on the front end of the support and slid rearwards so as to advance the first belly along the support. It is contemplated that the operator will continuously carry out this particular feeding operation so long as the apparatus is in operation.

The bracket members 18 are mounted over, and extend lengthwise of, the central portions of the horizontal parts of the upper members 11. They rest directly on, and are bolted to, the central portions of the outwardly extending flanges 22 on the upper margins of the side walls of the pan 16 and are preferably in the form of castings. The upper portions of the bracket members 18 are C-shaped in cross section and define a pair of opposed horizontal slideways 23 which are arranged in opposed relation and extend lengthwise of the frame structure as a whole.

Horizontally elongated crosshead

The horizontally elongated crosshead is designated in the drawings by the reference numeral 24 and is disposed over, and transversely of, the central portion of the frame structure. It is located between the bracket members 18 and consists of a bottom wall 25, a top wall 26, a pair of end walls 27, a front wall 28, a rear wall 29 and a partition 30. The front wall 18 is formed separately from the other walls of the crosshead and is removably secured in place by means of bolts 31 which extend through transverse holes in the marginal portion of the front wall into screw threaded sockets in a continuous, inwardly extending, right angle flange on the front margins of the bottom, top and end walls of the crosshead. The partition 30 extends horizontally. It is disposed midway between the bottom wall 25 and the top wall 26 and divides the interior of the crosshead into a lower chamber 32 and an upper chamber 33. The end walls 27 of the crosshead are provided with integral outwardly extending slide blocks 34 which fit within the slideways 23 and coact therewith to support the crosshead so that it is slidable horizontally and rectilinearly lengthwise of the frame structure.

Valve controlled fluid pressure operated means for sliding the crosshead laterally back and forth The means for sliding the crosshead back and forth lengthwise of the frame structure comprises a brine storage and supply tank 35, a pump 36, a cylinder-piston unit 37, and a two-position control valve 38 between the pump and the unit.

The brine storage and supply tank 35 is suitably mounted on the front or receiving end of the frame structure and receives brine from a source of supply (not shown) by way of a vertically extending valve controlled pipe 39. Associated with the tank 35 is a substantially horizontal drain pipe 40, one end of which extends through, and is connected to, the lower end of the downwardly inclined bottom wall 19 of the pan 16 and the other end of which extends into the upper portion of the tank 35. The purpose of the pipe 40 is to drain any excess brine from the pan 16 to the tank 35.

The pump 36 is mounted on the central portion of the platform 14 of the frame structure and is preferably of the centrifugal type or variety. It is driven by an electric motor 41 and comprises a blade equipped rotor (not shown) and a casing 42 around the rotor. The electric motor 41 is mounted on the platform 14 between the tank 35 and the pump 36 and has the armature shaft thereof connected by a coupling 43 to the rotor of the pump 36. The casing of the pump is provided with an inlet 44 and an outlet 45. The inlet 44 of the pump casing is connected by a pipe 46 to the lower end of the tank 35. When the pump is driven by the electric motor 41 it operates to draw brine from the tank and to force the brine under pressure through the casing outlet 45.

The cylinder-piston unit 37 extends horizontally and is located midway between the front upper corners of the bracket members 18 of the supporting structure. It is supported by way of a pair of aligned, horizontally extending bars 47 and consists of a cylinder 48 and a piston 49. The cylinder of the unit 37 extends lengthwise of the frame structure and is disposed in front of the slidably mounted crosshead 24. The bars 47 extend transversely of the frame structure and have the outer ends thereof bolted to the front upper corners of the bracket members 18. The inners ends of the bars are welded or otherwise fixedly secured to the central portion of the cylinder 48. The front end of the cylinder is provided with a head 50 and the rear end of the cylinder embodies a fixed head 51. The piston 49 is mounted in the cylinder 48 to slide back and forth between the heads 50 and 51 and has associated with it a horizontal piston rod 52 which extends slidably through a stuffing box 53 on the central portion of the rear head 51 of the cylinder 48. The front end of the rod 52, i. e., the end that extends into the cylinder, is fixedly connected to the central portion of the piston 49 and the rear end of the piston rod is connected to a forwardly extending lug 54 on the central portion of the removable front wall 28 of the crosshead 24. When brine under pressure is delivered into the front end of the cylinder while the rear end of the cylinder is vented the piston slides rearwards and operates through the medium of the piston rod 52 to slide the crosshead 24 towards the rear end of the frame structure. When the rear end of the cylinder is supplied with brine under pressure while the front end of the cylinder is vented the piston 49 slides forwards and operates through the medium of the piston rod 52 to slide the crosshead towards the front or receiving end of the frame structure.

The two-position control valve 38 is disposed between the central portions of the bracket members 18 and serves to control the flow of brine under pressure to and from opposite ends of the cylinder of the unit 37. It is supported on a horizontally extending channel bar 55 and consists of a cylindrical casing 56 and a rotatable valve member 57 in the casing. The channel bar 55 is disposed over, and extends transversely of, the central portion of the frame structure and has the ends thereof suitably secured to the central portions of the bracket members 18. The cylindrical casing 56 of the valve 38 is suitably connected to one end portion of the channel bar 55 and has cross walls 58 at its ends. It is positioned so that the axis of the rotatable valve member 57 extends horizontally and also transversely of the frame structure and has four ports 59, 60, 61 and 62. As shown in Figure 8, the ports 59 and 60 are disposed diametrically opposite one another and the ports 61 and 62 are disposed diametrically opposite one another and at right angles to the ports 59 and 60. The port 59 is connected by piping 63 to the outlet 45 of the pump 36 so as to receive brine under pressure therefrom in connection with drive of the pump by the electric motor 41. The piping 63 comprises a suitable arrangement of pipes and elbows and includes a shut-off valve 64 which, when in its closed position, stops the flow of brine under pressure from the pump to the port 59. The port 60 in the casing 56 of the valve 38 is connected by a return pipe 65 to the interior of the brine storage and supply tank 35 at the front end of the frame structure. The port 61 is connected to the front end of the cylinder 48 by a pipe 66; and the port 62 is connected by a pipe 67 to the rear end of the cylinder of the unit 37. The rotatable valve member 57 of the valve 38 is adapted to rotate back and forth throughout a 90° arc and has formed in it a pair of arcuate ducts 68 and 69. The latter are oppositely disposed and extend through 90° arcs. When the valve member 57 is positioned as shown in full lines in Fig. 8 the duct 68 establishes communication between the port 59 and the port 61 and the duct 69 establishes communication between the port 62 and the port 60. As the result of this brine under pressure flows through the piping 63, the port 59, the duct 68, the port 61 and the pipe 66 into the front end of the cylinder 48 and causes the piston 49 together with the crosshead 24 to slide rearwards, and the brine in the rear end of the cylinder is caused to flow back to the tank 35 via the pipe 67, the port 62, the duct 69, the port 60 and the pipe 65. When the valve member 57 is turned 90° in a counterclockwise direction as viewed in Figs. 1 and 8 the duct 69 establishes communication between the port 59 and the port 62 and the duct 68 establishes communication between the port 61 and the port 60. As the result of this brine under pressure flows through the piping 63, the port 59, the duct 69 and the pipe 67 into the rear end of the cylinder 48 and slides the piston 69 together with the crosshead forwards, i. e., towards the front end of the frame structure, and the brine in the rear end of the cylinder is returned to the supply tank 35 via the pipe 66, the port 61, the duct 68, the port 60 and the pipe 65. It is clearly apparent from the foregoing that when the rotary valve member 57 is turned in a clockwise direction into the position shown in full lines in Fig. 8 the piston and crosshead are caused to slide rearwards and when the valve member is turned throughout a 90° arc in a counterclockwise direction into the position shown in dotted lines in Fig. 8 the piston, together with the crosshead, is caused to slide forwards. As shown in Fig. 3 of the drawings the rotatable valve member 57 of the valve 38 is provided with a horizontal shaft 70 which extends through a stuffing box in the central portion of the inner crosswall 58 of the valve casing 56 and underlies the exposed portion of the piston rod 52.

Associated with the valve 38 is mechanism for automatically turning the rotatable valve member 57 back and forth between its two operating positions. Such mechanism is best illustrated in Figure 9 and comprises a pair of arms 71 and 72 and an arm actuating element 73. The arms 71 and 72 are located directly inwards of the valve 38 and under the piston rod 52. They are fixedly connected to, and project radially from, the shaft 70 and extend at approximately right angles to one another. The arm actuating element 73 is fixedly connected to, and depends from, the piston rod and is arranged so that its lower end is disposed between the two arms. When the rotatable valve member 57 is positioned as shown in full lines in Figure 8 the depending arm actuating member 73 assumes the position shown in full lines in Fig. 9. In such position the lower end of the element overlies the arm 72 and is spaced a small distance forwards of the arm 71. While the valve member 57 is positioned as shown in full lines in Fig. 8 brine under pressure flows into the front end of the cylinder 48 and causes the piston and crosshead to slide rearwards as hereinbefore pointed out. In connection with rearward sliding movement of the piston rod the lower end of the depending arm actuating element 73 strikes against the arm 71 and causes the arm to swing throughout a substantially 90° arc in a counterclockwise direction as viewed in Fig. 9. Such swinging on the part of the arm 71 causes the valve member 57 to turn 90° in a counterclockwise direction as viewed in Fig. 8. When the valve member is so turned brine under pressure enters the rear end of the cylinder 48 and causes the piston and crosshead to slide rearwards as hereinbefore pointed out. In connection with forward sliding movement of the piston rod the lower end of the element 73 strikes against the arm 72 and causes it to turn throughout a 90° arc in a clockwise direction. This results in clockwise turning of the rotatable valve member 57 to its original starting position. After such turning of the valve member a subsequent similar cycle of operation occurs. In connection with operation of the apparatus the mechanism consisting of the pair of arms 71 and 72 and the depending arm actuating element 73 operates automatically to turn the valve member 57 back and forth to the end that the piston and crosshead slide continuously back and forth. Operation is stopped by closing the shut-off valve 64 in the piping 63 between the outlet 45 of the pump casing 42 and the port 59 in the casing 56 of the valve 38.

*Brine injecting needles*

The needles of the apparatus are designated in the drawings by the reference numeral 74 and consists of upper parts 75, lower parts 76, and coupling members 77 between the upper and lower parts. They are located a small distance in back of the horizontally slidable crosshead 24 and are in the form of a rectilinear series which extends transversely of the frame structure and is in parallel relation with the crosshead. As shown in Fig. 2 of the drawings the needles are spaced equidistantly apart and extend from one end of the crosshead to the other. The upper ends of the upper parts 75 of the needles are provided with integral enlarged pistons 78 and these, as shown in Figures 4, 5 and 6, are mounted for vertical sliding movement in the lower portions of vertically extending cylinders 79 and are provided at the upper ends thereof with integral centrally disposed circular lugs 80 of less diameter than the pistons. Extending longitudinally through the upper parts 75 of the needles are ducts 81, the upper ends of which terminate adjacent the central portions of the pistons 78 and communicate with annular grooves 82 by way of radially extending ducts 83, and the lower ends of which extend through the lower ends of the upper parts 75. The grooves 82 are formed in the cylindrical side surfaces of the pistons 78 and are located substantially midway between the end surfaces of the pistons. The lower parts 76 of the needles are disposed directly beneath the upper parts 75 and are in axial alignment with the latter. They have pointed lower ends and embody longitudinally extending ducts 84, the upper ends of which extend through the upper ends of the lower parts 76 and communicate with the lower ends of the longitudinally extending ducts 81 in the upper parts 75, and the lower ends of which terminate adjacent the pointed lower ends of the lower parts and lead to, and communicate with, radially or laterally extending discharge orifices 85. The upper ends of the lower parts 76 of the needles are provided with external screw threads and embody directly beneath the latter integral polygonal enlargements 86. The coupling members 77 of the needles are tubular and serve to connect the upper and lower parts 75 and 76. The upper ends of the coupling members extend around the lower ends of the upper parts 75 and are connected thereto by screw thread connections 87. The lower ends of the coupling members are of reduced size. They extend around the upper ends of the lower needle parts 76 and have internal screw threads in interfitting relation with the external screw threads that are directly above the polygonal enlargements 86. Such enlargements permit the lower parts of the needles to be turned by a wrench or other turning tool into connected or disconnected relation with the coupling members. As hereinafter described more in detail, the needles, during initial rearward sliding movement of the crosshead, are slid downwards so as to bring the pointed lower ends of the lower parts 76 into penetrating relation with the subjacent belly, and during initial forward shift of the crosshead are slid upwards so as to withdraw the pointed lower ends of the lower parts from the subjacent belly. As also hereinafter described more in detail, when the lower ends of the lower parts of the needles are in penetrating relation with the subjacent belly brine under pressure flows downwards through the ducts in the upper and lower parts and is discharged into the belly via the discharge orifices 85.

The cylinders 79 are located a small distance rearwards of the rear wall 29 of the crosshead 24 and have stuffing boxes 88 at their lower ends and stuffing boxes 89 at their upper ends. The lower ends of the cylinders are provided with integral forwardly extending tubular bosses 90 and these are located directly above the upper ends of the stuffing boxes 88 and have the outer ends thereof in abutment with the lower portion of the rear wall 29 of the crosshead 24. Bolts 91 serve to clamp the tubular bosses 90 against the lower portion of the crosshead rear wall 29. The heads of these bolts are disposed in the lower portion of the lower chamber 32 in the crosshead and the shanks of the bolts extend through holes 92 in the lower portion of the crosshead rear wall and are in interfitting relation with internal screw threads in the outer ends of the bosses. Open ended bores 93 are formed in the bolts 91 and these bores extend centrally and longitudinally through the bolts and establish communication between the lower chamber 32 and the lower ends of the interiors of the cylinders 79. The upper ends of the cylinders are provided with integral forwardly extending tubular bosses 94 and these are located directly beneath the lower ends of the stuffing boxes 89 and have the outer ends thereof in abutment with the upper portion of the crosshead rear wall 29. Bolts 95 serve to clamp the tubular bosses 94 against the upper portion of the rear wall 29 of the crosshead. The heads of the bolts 95 are disposed in the upper portion of the upper chamber 33 in the crosshead 24 and the shanks of said bolts extend through holes 96 in the upper portion of the crosshead rear wall 29 and are in interfitting relation with internal screw threads in the outer ends of the bosses 94. Open ended bores 97 are formed in the bolts 95 and these bores extend centrally and longitudinally through the bolts and establish communication between the upper chamber 33 and the upper ends of the interiors of the cylinders 79.

The upper parts 75 of the needles extend slidably through the stuffing boxes 88 at the lower ends of the cylinders. The upper ends of the coupling members 77 of the needles coact with the lower ends of the stuffing boxes 88 to limit upward sliding movement of the needles, and the lower ends of the pistons 78 coact with integral annular upstanding lugs 98 on the upper ends of the stuffing boxes 88 to limit downward sliding movement of the needles. When brine under pressure is introduced from the lower chamber 32 into the lower ends of the cylinders 79 while the upper ends are vented the needles are caused to slide upwards, and when brine under pressure is introduced from the upper chamber 23 into the upper ends of the cylinders 79 while the lower ends of the cylinders are vented the needles are caused to slide downwards. The length of the needles is such that when the needles are slid downwards to their fullest extent the pointed lower ends of the lower parts 76 are brought into penetrating relation with the subjacent belly on the grill-like support 17 of the frame structure.

*Fluid pressure operated means for effecting downward and upward sliding of the needles*

The fluid pressure operated means for sliding the needles downwards into penetrating relation with the subjacent belly when the crosshead is initially shifted laterally toward the rear end of the frame structure and for sliding the needles upwards during lateral shift of the crosshead towards the front end of the frame structure, comprises a two-position valve 99. The latter is positioned in side by side and coaxial relation with the two-position valve 38 of the fluid pressure operated means for shifting the crosshead 24 laterally back and forth lengthwise of the frame structure and consists of a cylindrical casing 100 and a rotatable valve member 101 in the casing. The casing 100 of the valve 99 is suitably connected to the channel bar 55 and is located on the end portion of the channel bar that is opposite to the end portion on which the cylindrical casing 56 of the valve 38 is mounted. It has crosswalls 102 at its ends and embodies four ports 103, 104, 105 and 106. As shown in Fig. 8, the ports 103 and 104 are disposed diametrically opposite one another and the ports 105 and 106 are disposed diametrically opposite one another and at right angles to the ports 103 and 104. The port 103 is connected by a pipe 107 to the piping 63 so as to receive brine under pressure from the motor driven pump 36. The port 104 in the casing 100 of the valve 99 is connected by a return pipe 108 to the interior of the brine storage and supply tank 35 at the front end of the frame structure. The port 105 is connected to the upper chamber 33 in the crosshead 24 by way of a flexible conduit 109; and the port 106 is connected to the lower chamber 32 by a flexible conduit 110. The rotatable valve member 101 of the valve 99 is adapted to rotate back and forth throughout a 90° arc and has formed in it a pair of arcuate ducts 111 and 112. The latter are oppositely disposed and extend throughout 90° arcs. When the valve 99 is positioned as shown in full lines in Fig. 8, the duct 111 establishes communication between the port 103 and the port 105; and the duct 112 establishes communication between the ports 106 and 104. As the result of this brine under pressure flows through the pipe 107, the port 103, the duct 11, the port 105, the flexible conduit 109 and the upper chamber 33 and then into the upper ends of the cylinders 79 and causes the needles 74 to slide downwards into penetrating relation with the subjacent belly, and the brine in the lower ends of the cylinders 79 is caused to flow back to the tank 35 via the lower chamber 32, the flexible conduit 110, the port 106, the duct 112, the port 104 and the pipe 108. When the valve member 101 of the valve 99 is turned 90° in a counterclockwise direction as viewed in Fig. 8, the duct 111 establishes communication between the ports 103 and 106; and the duct 112 establishes communication between the ports 105 and 104. As the result of this brine under pressure flows through the pipe 107, the port 103, the duct 11, the port 106, the flexible conduit 110 and the lower chamber 32 and then into the lower ends of the cylinders 79 and causes the needles 74 to slide upwards out of penetrating relation with the subjacent belly, and the brine in the upper ends of the cylinders 79 is returned to the supply tank 35 via the upper chamber 33, the flexible conduit 109, the port 105, the duct 112, the port 104 and the pipe 108. It is clearly apparent from the foregoing that when the rotary valve member 101 of the valve 99 is turned in a clockwise direction into the position shown in full lines in Fig. 8, the needles are caused to slide downwards and when the valve member is turned throughout a 90° arc in a counterclockwise direction into the position shown in dotted lines in Fig. 8, the needles are caused to slide upwards. The shaft 70 for the rotatable member 57 of the valve 38 extends through a hole in the central portion of the inner crosswall of the casing 100 of the valve 99 and is connected to the rotatable valve member 101 in order that the two valve members are connected together and rotate back and forth conjointly in response to the action of the mechanism consisting of the arms 71 and 72 on the shaft 70 and the depending arm actuating element 73 on the piston rod 52. The rotary valve member 101 of the valve 99 is so arranged that when it is positioned as shown in full lines in Fig. 8 the rotatable valve member 57 of the valve 38 is also in the position shown in full lines in Fig. 8. When the two rotatable valve members are turned into the positions shown in full lines in Fig. 8 the piston 49 and the crosshead 24 slide rearwards as heretofore mentioned and in connection with initial rearward sliding movement of the piston and crosshead the needles move downwards into penetrating relation with the subjacent belly. When the two rotatable valve members are turned 90° in a counterclockwise direction into the position shown in dotted lines in Fig. 8 the piston 49 and the crosshead 24 slide forwards and, in connection with initial forward sliding movement of the piston and crosshead, the needles 24 slide upwards out of penetrating relation with the subjacent belly.

*Automatic means for forcing brine under pressure through the needles when the latter are in penetrating relation with the subjacent belly*

The means whereby each time the needles are slid downwards into penetrating relation with the subjacent belly brine under pressure is forced through the needles into such belly comprises free or floating variety pistons 113, C-shaped ducts 114 and C-shaped ducts 115. The pistons 113 correspond in number to, and are respectively mounted for vertical sliding movement in the upper portions of, the cylinders 79. They are cup-shaped and consist of imperforate bottom walls 116 and annular side walls 117. Upward sliding movement of the pistons 113 is limited by vertically extending stop screws 118 which extend through the stuffing boxes 89 at the upper ends of the cylinders 79 and have polygonal heads 119 at their upper ends for turning purposes. The lower ends of the stop screws project beneath the lower ends of the stuffing boxes 89 and coact with the bottom walls 116 to limit upward sliding movement of the pistons 113. By adjusting the stop screws upwards or downwards the extent to which the pistons 113 slide upwards may be adjusted so as to vary the amount of brine that is injected through the needles into the subjacent belly after the needles are slid downwards into penetrating relation with such belly.

The C-shaped ducts 114 are formed in rearwardly extending integral bosses 120 on the central portions of the cylinders 79 and consists of horizontally extending lower parts 121, vertically extending intermediate parts 122, and horizontally extending upper parts 123. The inner ends of the lower and upper parts 121 and 122 intersect the inner periphery of the cylinders 79 and hence are in communication with the central portions of the interiors of the cylinders 79. The ducts 114 are of such height and so vertically positioned that when the needles 74 reach the upper end of their upper sliding movement the pistons 78 are located between the upper and lower branches 121 and 123 of the ducts (see Fig. 4) and hence when the needles are slid upwards to their fullest extent brine under pressure is permitted to flow from the lower portions of the cylinders 79 around the pistons 78 into the spaces around the lugs 80. The brine under pressure that flows upwards through the ducts 114 and into the spaces around the lugs 80 when the needles are slid upwards to their fullest extent as shown in Fig. 4, operates to force the free or floating variety pistons 117 upwards until they are arrested by engagement of the crosswalls 116 thereof with the lower ends of the stop screws 118 (see Fig. 5). Down or back flow of brine through the C-shaped ducts 114 is prevented by ball type check valves 124 in the vertically extending parts 122. The latter are located in the central portions of the vertically extending parts 124 of the C-shaped ducts 114 and are urged downwards against upwardly flared seats 125 by way of spiral compression spring 126 which are disposed in the upper portions of the duct parts 122. When the crosshead 24 reaches the end of its rearward sliding movement the rotatable valve members of the two position valves 38 and 99 are automatically turned in a counterclockwise direction into the positions shown in dotted lines in Fig. 8, as previously pointed out. As soon as the rotatable valve member 101 is turned brine under pressure flows into the lower ends of the cylinders 79 from the lower chamber 32 and venting of the upper chamber 33 occurs. The brine under pressure that enters the lower ends of the cylinders in connection with the initial part of forward sliding movement of the crosshead forces the needles upwards so as to withdraw their lower ends from the subjacent belly. As soon as the needles reach the end of their upward sliding movement brine under pressure flows from the lower portions of the cylinders through the C-shaped ducts 114 into the upper portions of the cylinders and forces the free or floating variety pistons upwards into the position shown in full lines in Fig. 5. Upward sliding movement of the pistons 113 occurs during the balance of forward sliding movement of the crosshead and needles. It is contemplated that the pistons 113 will reach the end of their upward sliding movement as the crosshead and needles reach the end of their forward sliding movement. In view of the action of the check valves 124 the brine that flows into the upper portions of the cylinders 79 via the ducts 114 is trapped or confined between the pistons 78 on the upper ends of the needles 74 and the free or floating variety pistons 113 until, in connection with downward sliding movement of the pistons 113 and the needles, it is released by the C-shaped ducts 115 as described hereafter. When the crosshead and needles reach the end of their forward sliding movement the rotatable valve members of the valves 38 and 99 are turned in a clockwise direction into the positions shown in full lines in Fig. 8, as hereinbefore described. As soon as the valve member 101 of the valve 99 is turned into the position shown in full lines in Fig. 8 brine under pressure flows into the upper ends of the cylinders 79 from the upper chamber 33 in the crosshead 24 and venting of the lower chamber 32 occurs. The brine under pressure that enters the upper ends of the cylinders 79 forces the pistons 113 to slide downwards and such pistons, through the medium of the brine that is trapped or confined between them and the pistons 78, cause the needles to slide downwards conjointly therewith. It is contemplated that during the initial part of rearward sliding movement of the crosshead and needles the needles will be slid downwards to their fullest extent into penetrating relation with the subjacent belly.

The C-shaped ducts 115 are formed in rearwardly extending integral bosses 127 on the lower portions of the cylinders 79. Such bosses are positioned a small distance above the tubular bosses 90 as shown in Figures 4 and 6. The inner ends of the lower and upper parts of the C-shaped ducts 115 intersect the inner peripheries of the cylinders 79 and hence such ducts are in communication with the cylinder interiors. The ducts 115 are of such height and so positioned that when the needles are slid downwards to their fullest extent in response to downward sliding movement of the free or floating variety pistons 113 the portions of the pistons 78 that are above the annular grooves 82 are disposed between the horizontally extending lower and upper parts of the ducts. Because of this the ducts 115 serve when the needles reach the end of their downward sliding movement to form by-passes whereby the brine that is trapped or confined between the free or floating variety pistons 113 and the pistons 78 on the upper ends of the needles is forced, in connection with further downward sliding movement of the pistons 113, to flow through the grooves 82 and the horizontally extending ducts 83 and then downward through the longitudinally extending ducts in the upper and lower parts of the needles into the belly in which the lower ends of the needles are inserted. It is contemplated that as soon as the rotatable valve member 101 of the valve 99 is turned clockwise into the position shown in full lines in Fig. 8 the needles will be quickly moved downwards in response to the action of the free or floating variety pistons 113. This means that the needles will be slid down into penetrating relation during the initial part of rearward sliding movement of the crosshead 24. As soon as the needles are slid downwards to their fullest extent the C-shaped ducts 115 come into play and result in further downward sliding movement of the pistons 113 forcing the brine that was originally trapped between such pistons and the pistons 78 being forced downwards through the ducts 115 and then downwards through the needles into the subjacent belly. Downward sliding movement of the pistons 113 relatively to the pistons 78 occurs during the balance of rearward sliding movement of the crosshead and needles and effects the desired injection of brine into the belly beneath the needles.

*Operation*

When it is desired to operate the apparatus the operator slides the bellies to be treated, one at a time, rearwards over the front portion of the grill-like support 17 until the rearmost portion of the first belly underlies the needles 74. Thereafter the operator starts the electric motor 41 and opens the shut-off valve 64. Immediately upon opening of such valve the needles are caused first to slide downwards into penetrating relation with the subjacent belly, then to slide rearwards, then to slide upwards out of penetrating relation with such belly, and then to slide forwards to complete their cycle of operation. As heretofore pointed out, brine under pressure is automatically forced through the needles and into the belly during rearward shift or sliding movement of the needles. The needles automatically repeat their cycle of operation and as a result the subjacent belly is injected with brine while it is being fed step by step rearwards during rearward sliding movement of the crosshead and needles. The amount of brine that is injected into the subjacent belly each time the needles are slid downwards may be varied by raising or lowering the stop screws 18. Upward adjustment of the stop screws increases the extent of upward sliding movement of the free or floating variety pistons 113 and thereby increases the amount of brine that is injected into the belly and downward adjustment of the stop screws decreases the extent of upward sliding movement of such pistons 113 and thereby decreases the amount of brine that flows downwards through the needles.

The apparatus is automatic except for manual feed or sliding movement of the bellies to the needles. It is comparatively simple so far as design and construction are concerned and hence may be produced at a comparatively low cost.

APPARATUS OF FIGURE 10

The apparatus that is illustrated in Figure 10 of the drawings constitutes another form or embodiment of the invention. It comprises a frame structure, a horizontally elongated crosshead 24a over the central portion of the frame structure, valve controlled fluid pressure operated means for shifting the crosshead laterally back and forth lengthwise of the structure, a series of laterally spaced upstanding vertically slidable hollow needles 74a, valve controlled fluid pressure operated means for sliding the needles downwards into penetrating relation with the subjacent belly when the crosshead is initially shifted laterally towards the rear end of the frame structure and for sliding the needles upwards during initial lateral shift of the crosshead towards the front end of the frame structure and automatic means whereby each time the needles are slid downwards into inserted or penetrating relation with the subjacent belly brine under pressure is forced downwards through the needles into such belly. The mode of operation of the apparatus of Fig. 10 is exactly the same as that of the apparatus of Figs. 1 to 9, inclusive. The only difference between the two apparatuses is that in the apparatus of Fig. 10 the crosshead 24a, instead of being mounted to slide rectilinearly back and forth lengthwise of the supporting structure, is mounted to swing laterally. In the apparatus of Fig. 10 the crosshead 24a is connected to the upper ends of a pair of laterally spaced upstanding arms 128. The latter are arranged in straddled relation with the grill-like support of the frame structure and have the lower ends thereof provided with coaxial horizontally disposed pivot pins 129 whereby they are mounted or supported so as to swing back and forth lengthwise of the frame structure. The pivot pins 129 are suitably mounted on the horizontal platform of the supporting structure. The front wall of the crosshead 24a is provided with a forwardly extending lug 54a and this is connected by a pin and slide connection 130 to the rear end of the piston rod of the cylinder-piston unit constituting a part of the valve controlled fluid pressure operated means for shifting the crosshead laterally back and forth lengthwise of the frame structure. The arms 128 for supporting the crosshead 24a so that it is capable of swinging laterally back and forth may, if desired, be reversely arranged, i. e., so that the lower ends thereof are connected to the crosshead and their upper ends are pivotally supported.

Whereas the invention has been described as a medium for injecting brine into hog bellies it is to be understood that the apparatus may also be used to inject other curing liquid into other pieces of meat or the like. It is also to be understood that the invention is not to be restricted to the details set forth since these may be modified within the scope of the appended claims without departing from the spirit and scope of the invention.

Having thus described our invention, what we claim as new and desire to secure by Letters Patent is:

1. An apparatus adapted to treat a hog belly or the like and comprising a frame structure provided with stationary means for supporting the belly so that it is freely movable in one direction along a substantially horizontal path, a horizontal series of laterally spaced upstanding hollow needles disposed over, and transversely of, the path, having pointed lower ends, and provided with mounting means whereby they are movable downwards and upwards and also laterally back and forth lengthwise of said path, mechanism operative automatically in connection with actuation of the apparatus to control the needles so that they repeatedly go through a cycle of operation consisting of first moving downwards until the belly is impaled on said pointed lower ends, then moving laterally a small distance in one direction along the path and causing the impaled belly positively to move with them, then moving upwards so as to withdraw their said pointed lower ends from said belly, and then moving laterally in the opposite direction to their starting or original position, and means operative automatically each time the needles are moved downwards into the belly to force curing liquid under pressure through the needles and into said belly.

2. An apparatus adapted to treat hog bellies or the like and comprising a frame structure provided at the upper portion thereof with an elongated stationary tray for supporting the bellies to be treated so that they are freely movable one after another in one direction lengthwise of the tray, a horizontal series of laterally spaced upstanding hollow needles disposed over, and transversely of, the tray, embodying pointed lower ends with laterally extending discharge orifices, and having mounting means whereby they are bodily movable downwards and upwards and also laterally back and forth lengthwise of said tray, mechanism operative automatically in connection with actuation of the apparatus to control the needles so that they repeatedly go through a cycle of operation consisting of first moving downwards until the subjacent belly is impaled on their pointed lower ends, then moving laterally a small distance in said one direction and causing the impaled subjacent belly positively to move with them, then moving upwards so as to withdraw their said pointed lower ends from said subjacent belly, and then moving laterally in the opposite direction to their starting or original position, and means operative automatically each time the needles are moved downwards into the subjacent belly to force curing liquid under pressure downwards through the needles and then laterally through the orifices into said subjacent belly.

3. An apparatus adapted to treat hog bellies or the like and comprising a frame structure provided with stationary means for supporting the bellies to be treated so that they are freely movable one after another in one direction along a substantially horizontal path, a horizontal series of laterally spaced upstanding hollow needles disposed over, and transversely of, the path, having pointed lower ends, and provided with means whereby they are mounted so that they are capable of moving downwards and upwards and also swinging laterally back and forth lengthwise of the path, mechanism operative automatically in connection with actuation of the apparatus to control the needles so that they repeatedly go through a cycle of operation consisting of first moving downwards until the subjacent belly is impaled on their pointed lower ends, then swinging laterally a small distance in said one direction along the path and causing the impaled subjacent belly positively to move with them, then moving upwards so as to withdraw their said pointed lower ends from said subjacent belly, and then swinging laterally in the opposite direction to their original or starting position, and means operative automatically each time the needles are moved downwards into the subjacent belly to force curing liquid under pressure through the needles and into said subjacent belly.

4. An apparatus adapted to treat hog bellies or the like and comprising a horizontally elongated frame structure provided with means at the upper portion thereof for supporting the bellies to be treated so that they are horizontally movable one after another from the front end of the frame structure to the rear end, a horizontally extending crosshead disposed over, and transversely of, the frame structure and provided with mounting means therefor whereby it is movable laterally a comparatively small distance lengthwise of the frame structure, a horizontal series of spaced apart upstanding hollow needles extending lengthwise of, and depending from, the crosshead, having pointed lower ends, and mounted with respect to said crosshead so that they are movable laterally therewith and are also freely slidable downwards and upwards relatively thereto, power operated means for moving the crosshead together with the needles laterally back and forth, valve controlled fluid pressure operated means operative automatically to slide the needles downwards relatively to the crosshead into penetrating relation with the subjacent belly after lateral shift of the crosshead towards the front end of the frame structure and to slide the needles upwards relatively to said crosshead out of penetrating relation with the subjacent belly after lateral shift of the crosshead towards the rear end of said frame structure, and means operative automatically each time the needles are slid downwards into penetrating relation with the subjacent belly to force curing liquid under pressure through the needles and into said subjacent belly.

5. An apparatus adapted to treat hog bellies or the like and comprising a horizontally elongated frame structure provided with means at the upper portion thereof for supporting the bellies to be treated so that they are horizontally movable one after another from the front end of the frame structure to the rear end, a horizontally elongated crosshead disposed over, and transversely of, the frame structure and provided with mounting means therefor whereby it is movable laterally a comparatively small distance lengthwise of the frame structure, a horizontal series of laterally spaced upstanding hollow needles extending lengthwise of, and depending from, the crosshead and mounted with respect to said crosshead so that they are movable laterally therewith and are also slidable downwards and upwards relatively thereto, valve controlled fluid pressure operated means for moving the crosshead together with the needles laterally back and forth, valve controlled fluid pressure operated means operative automatically to slide the needles downwards into penetrating relation with the subjacent belly after lateral shift of the crosshead towards the front end of the frame structure and to slide the needles upwards out of penetrating relation with the subjacent belly after lateral shift of the crosshead towards the rear end of said frame structure, and means operative automatically each time the needles are slid downwards into penetrating relation with the subjacent belly to force curing liquid under pressure through the needles and into said subjacent belly.

6. An apparatus adapted to treat hog bellies or the like and comprising a horizontally elongated frame structure provided with means at the upper portion thereof for supporting the bellies to be treated so that they are horizontally movable one after another from the front end of the frame structure to the rear end, a horizontally elongated crosshead disposed over, and transversely of, the central portion of the frame structure and provided with mounting means therefor whereby it is slidable laterally a comparatively small distance lengthwise of the frame structure, a horizontal series of spaced apart upstanding hollow needles extending lengthwise of, and depending from, the crosshead and mounted with respect to said crosshead so that they are slidable laterally therewith and are also slidable downwards and upwards relatively thereto, valve controlled fluid pressure operated means for sliding the crosshead together with the needles laterally back and forth, valve controlled fluid pressure operated means operative automatically to slide the needles downwards into penetrating relation with the subjacent belly after lateral sliding movement of the crosshead towards the front end of the frame structure and to slide the needles upwards out of penetrating relation with the subjacent belly after lateral sliding movement of the crosshead towards the rear end of said frame structure, and means operative automatically each time the needles are slid downwards into penetrating relation with the subjacent belly to force curing liquid under pressure through the needles and into said subjacent belly.

7. An apparatus adapted to treat hog bellies or the like and comprising a horizontally elongated frame structure provided with means at the upper portion thereof for supporting the bellies to be treated so that they are horizontally movable one after another from the front end of the frame structure to the rear end, a horizontally elongated crosshead disposed over, and transversely of, the frame structure, having mounting means therefor whereby it is movable laterally lengthwise of the frame structure, and provided with a longitudinal series of fixed vertically extending laterally spaced cylinders, a series of upstanding hollow needles corresponding in number to, and associated respectively with, the cylinders, and provided at the upper ends thereof with pistons that are mounted in the cylinders for vertical sliding movement and serve to support the needles so that they are slidable downwards into penetrating relation with the subjacent belly and upwards out of such relation, power operated means for moving the crosshead laterally back and forth, valve controlled fluid pressure operated means including said cylinders and pistons and operative automatically to slide the needles downwards after lateral shift of the crosshead towards the front end of the frame structure and to slide the needles upwards after lateral shift of the crosshead towards the rear end of the frame structure, and means operative automatically each time the needles are slid downwards into penetrating relation with the subjacent belly to force curing liquid under pressure through the needles and into said subjacent belly.

8. An apparatus adapted to treat hog bellies or the like and comprising a horizontally elongated frame structure provided with means at the upper portion thereof for supporting the bellies to be treated so that they are horizontally movable one after another from the front end of the frame structure to the rear end, a horizontally elongated crosshead disposed over, and transversely of, the frame structure, having mounting means therefor whereby it is slidable laterally lengthwise of the frame structure, and provided with a longitudinal series of fixed vertically extending laterally spaced cylinders, a series of upstanding hollow needles corresponding in number to, and associated respectively with, the cylinders, and provided at the upper ends thereof with pistons that are mounted in the cylinders for vertical sliding movement and serve to support the needles so that they are slidable downwards into penetrating relation with the subjacent belly and upwards out of such relation, valve controlled fluid pressure operated means for sliding the crosshead laterally back and forth, valve controlled fluid pressure operated means including said cylinders and pistons and operative automatically to slide the needles downwards after sliding movement of the crosshead towards the front end of the frame structure and to slide the needles upwards after lateral sliding movement of the crosshead towards the rear end of the frame structure, and means operative automatically each time the needles are slid downwards into penetrating relation with the subjacent belly to force curing liquid under pressure through the needles and into said subjacent belly.

9. An apparatus adapted to treat hog bellies or the like and comprising a frame structure provided with means for supporting the bellies to be treated so that they are movable one after another in a horizontal path, a horizontally elongated crosshead disposed over, and transversely of, said path, and provided with a longitudinal series of fixed vertically extending spaced apart cylinders, a series of upstanding hollow needles corresponding in number to, and associated respectively with, the cylinders, provided at their upper ends with pistons that are mounted in the lower portions of the cylinders for vertical sliding movement and serve to support the needles so that they are slidable downwards into penetrating relation with the subjacent belly and upwards out of such relation, valve controlled fluid operated means including said cylinders and pistons and operative continuously to slide the needles downwards and upwards, and means including free or floating variety pistons in the upper portions of the cylinders and operative automatically each time the needles are slid downwards into penetrating relation with the subjacent belly to force curing liquid under pressure through the needles and into said subjacent belly.

10. An apparatus adapted to treat hog bellies or the like and comprising a horizontally elongated frame structure provided with means at the upper portion thereof for supporting the bellies to be treated so that they are horizontally movable one after another from the front end of the frame structure to the rear end, a horizontally elongated crosshead disposed over, and transversely of, the frame structure, having mounting means therefor whereby it is movable laterally lengthwise of the frame structure, and provided with a longitudinal series of fixed vertically extending laterally spaced cylinders, a series of upstanding hollow needles corresponding in number to, and associated respectively with, the cylinders and provided at the upper ends thereof with pistons that are mounted in the lower portions of the cylinders for vertical sliding movement and serve to support the needles so that they are slidable downwards into penetrating relation with the subjacent belly and upwards out of such relation, valve controlled fluid pressure operated means for sliding the crosshead together with the cylinders laterally back and forth, valve controlled fluid pressure operated means including said cylinders and pistons and operative automatically to slide the needles downwards after lateral movement of the crosshead towards the front end of the frame structure and to slide the needles upwards after lateral movement of the crosshead towards the rear end of the frame structure, and means including free or floating variety pistons in the upper portions of said cylinders and operative automatically each time the needles are slid downwards into penetrating relation with the subjacent belly to force curing liquid under pressure through the needles and into said subjacent belly.

11. An apparatus adapted to treat hog bellies or the like and comprising a horizontally elongated frame structure provided at the upper portion thereof with a longitudinally extending pan and, in addition, elongated foraminous tray means disposed over and lengthwise of the pan and adapted to have the bellies to be treated move in series form lengthwise thereover, a horizontal series of laterally spaced upstanding hollow needles disposed over, and transversely of, the tray means, having pointed lower ends, and provided with mounting means whereby they are movable downwards and upwards and also laterally back and forth lengthwise of said tray means, mechanism operative automatically in connection with actuation of the apparatus to control the needles so that they repeatedly go through a cycle of operation consisting of first moving downwards into penetrating relation with the subjacent belly, then moving laterally with the subjacent belly in one direction along said tray means, then moving upwards out of penetrating relation with said subjacent belly, and then moving laterally in the opposite direction to their starting or original position, means operative automatically each time the needles are moved downwards into penetrating relation with the subjacent belly to force curing liquid under pressure through the needles into said subjacent belly and embodying a curing liquid supply tank on the frame structure at a lower elevation than the pan and a pump having the inlet thereof connected to the tank and its inlet in communication with the needles, and a drain pipe between the pan and the tank for returning to the tank any excess curing liquid that is caught by said pan.

NORMAN J. ALLBRIGHT.
RALPH W. ILLSLEY.

References Cited in the file of this patent

UNITED STATES PATENTS

| Number | Name | Date |
| --- | --- | --- |
| 1,700,494 | Harrington | Jan. 29, 1929 |
| 1,992,464 | Blackman | Feb. 26, 1935 |
| 2,110,263 | Dziedzic | Mar. 8, 1938 |
| 2,503,147 | Applezweig | Apr. 4, 1950 |
| 2,520,719 | Hanson | Aug. 29, 1950 |
| 2,560,060 | Zwosta | July 10, 1951 |
| 2,587,024 | Avery | Feb. 26, 1952 |

FOREIGN PATENTS

| Number | Country | Date |
| --- | --- | --- |
| 177,568 | Switzerland | June 15, 1935 |
| 502,486 | Germany | July 11, 1930 |